United States Patent
Combs

(10) Patent No.: US 6,484,878 B1
(45) Date of Patent: Nov. 26, 2002

(54) CD-ROM HOLDER SUITABLE FOR BINDING

(75) Inventor: Jeff Combs, Greenwood, IN (US)

(73) Assignee: Discom Technologies, LLC, Greenwood, IN (US)

(*) Notice: Subject to any disclaimer, the term of this patent is extended or adjusted under 35 U.S.C. 154(b) by 0 days.

(21) Appl. No.: 09/471,061

(22) Filed: Dec. 22, 1999

Related U.S. Application Data

(60) Provisional application No. 60/114,651, filed on Jan. 4, 1999.

(51) Int. Cl.[7] ............................................. B65D 85/57
(52) U.S. Cl. ..................... 206/308.1; 206/311; 206/312
(58) Field of Search .............................. 206/308.1, 232, 206/312, 313, 309; 402/70, 73, 79; 281/21.1, 15.1, 31, 38, 50

(56) References Cited

U.S. PATENT DOCUMENTS

| | | | |
|---|---|---|---|
| 2,306,726 A | | 12/1942 | Hasin |
| 2,345,230 A | | 3/1944 | Bender |
| 2,512,577 A | | 6/1950 | Franck |
| 3,009,707 A | | 11/1961 | Schulein |
| 3,372,859 A | | 3/1968 | Bjorkengren et al. |
| 3,758,136 A | | 9/1973 | Guyer |
| 4,398,634 A | * | 8/1983 | McClosky ................. 206/484 |
| 4,492,306 A | * | 1/1985 | Cooper et al. ............. 206/232 |
| 4,549,658 A | | 10/1985 | Sfikas |
| 4,599,658 A | | 7/1986 | Saitoh et al. |
| 5,090,561 A | | 2/1992 | Spector |
| 5,462,160 A | | 10/1995 | Youngs |
| 5,501,540 A | * | 3/1996 | Ho ............................ 402/73 |
| 5,588,527 A | | 12/1996 | Youngs |
| 5,590,912 A | | 1/1997 | Stevens |
| 5,595,797 A | * | 1/1997 | Miller ....................... 206/311 |
| 5,669,491 A | | 9/1997 | Pettey |
| 5,690,220 A | | 11/1997 | Swan |
| 5,692,607 A | * | 12/1997 | Brosmith et al. .......... 206/232 |
| 5,694,743 A | | 12/1997 | Beighle |
| 5,713,605 A | | 2/1998 | Pace et al. |
| 5,782,349 A | * | 7/1998 | Combs ...................... 206/308.1 |
| 5,857,565 A | * | 1/1999 | Baker et al. ............... 206/232 |
| 5,881,870 A | * | 3/1999 | Nakahira et al. .......... 206/308.1 |
| 6,106,015 A | * | 8/2000 | Udwin et al. .............. 402/70 |

FOREIGN PATENT DOCUMENTS

| | | |
|---|---|---|
| FR | 1213757 | 4/1960 |
| GB | 341146 | 1/1931 |
| JP | 63316384 | 12/1988 |

* cited by examiner

*Primary Examiner*—Shian Luong
(74) *Attorney, Agent, or Firm*—Woodard, Emhardt, Naughton, Moriarty & McNett

(57) ABSTRACT

The present invention relates to a CD-ROM holder that is suitable for binding by being saddle stitched, sewn, or the like.

18 Claims, 1 Drawing Sheet

CD-ROM HOLDER SUITABLE FOR BINDING

CROSS-REFERENCE TO RELATED APPLICATION

This application claims priority benefit from U.S. Provisional Patent Application Serial No. 60/114,651, filed Jan 4, 1999.

TECHNICAL FIELD OF THE INVENTION

The present invention generally relates to bookbinding and, more particularly, to a CD-ROM holder suitable for binding.

BACKGROUND OF THE INVENTION

I have previously outlined a new and useful CD-ROM holder suitable for binding in my issued U.S. Pat. No. 5,782,349, the text and drawings which are hereby incorporated by reference herein in their entirety. The present invention represents an improved design, which may be used with books having stitched or sewn bindings.

SUMMARY OF THE INVENTION

The present invention relates to a CD-ROM holder that is suitable for binding by being saddle stitched, sewn, or the like.

In one form of the invention, a CD-ROM holder suitable for binding is disclosed, comprising a first sheet of heat-sealable material; a second sheet of heat-sealable material overlying said first sheet of heat-sealable material; a plurality of first heat seal lines joining said first sheet to said second sheet and defining a pocket sized to receive the CD-ROM; and a tear line formed in said first and second sheets and spaced from the pocket; wherein the holder may be bound by saddle stitching and easily unbound by dividing the holder along said tear line.

DETAILED DESCRIPTION OF THE PREFERRED EMBODIMENT

Figure 1:
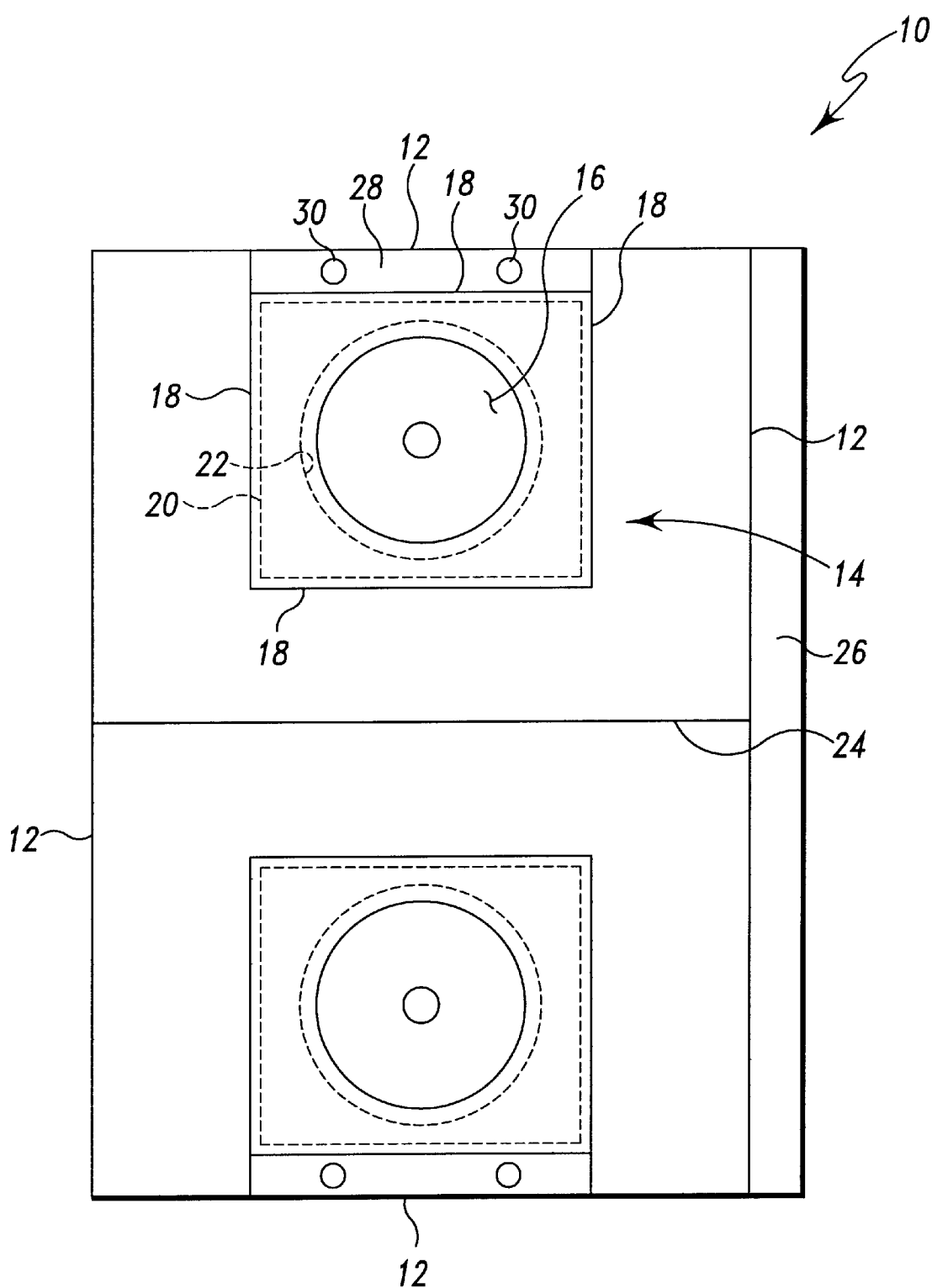
FIG. 1 is a schematic diagram of a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Referring to FIG. 1, there is illustrated a preferred embodiment of the CD-ROM holder of the present invention, indicated generally at 10. The CD-ROM holder 10 is formed from two overlying sheets of vinyl or other material which may be heat-sealed. In a preferred embodiment, the CD-ROM holder 10 is formed from two sheets of 14-gauge vinyl. The method of forming the CD-ROM holder 10 of the present invention by means of a heated die is disclosed in my U.S. Pat. No. 5,782,349.

In a preferred embodiment, the CD-ROM holder 10 includes edge seals 12 which substantially completely surround the perimeter of the CD-ROM holder 10. The edge seals 12 are preferably formed as a stitched rule, as is known in the art. The space or pocket 14, which captures the CD-ROM 16, is further delineated by pocket seals 18. The enclosed pocket 14 which captures the CD-ROM 16 is therefore bounded on all sides by the pocket seals 18. The pocket seals 18 are preferably formed as tear seals, which form a tear line for removing the pocket 14 from the remainder of the CD-ROM holder 10. Although the present invention comprehends a CD-ROM holder in which the CD-ROM 16 is simply contained within the sealed pocket 14, the preferred embodiment 10 of the present invention also includes a spacer 20, such as a cardboard spacer, within the pocket 14 containing the CD-ROM 16. The exterior dimensions of the spacer 20 are slightly smaller than the dimensions of the pocket 14 into which it is sealed and the spacer 20 includes a circular cutout 22 therein which is slightly larger than the CD-ROM 16, thereby allowing the CD-ROM 16 to fit within the circular cutout 22. Provision of the spacer 20 within the sealed pocket 14 substantially prevents movement of the CD-ROM 16 within the pocket 14.

The present invention comprehends an optional second pocket formed at the opposite end of the CD-ROM holder 10, wherein the second pocket is substantially identical to the first pocket. The second pocket may be used to hold an additional CD-ROM, a reply card for providing feedback from the retail customer to the publisher of the CD-ROM, or any other item desired to be packaged with the CD-ROM 16.

A thin rule seal 24 is provided substantially across the mid-line of the CD-ROM holder 10. The thin rule seal 24 facilitates removal of the CD-ROM holder 10 from the binding after it has been bound into the book. The CD-ROM holder 10 further includes a solid seal area 26 formed with a series of seals and lands as described in my prior U.S. Pat. No. 5,782,349 in order to provide a relatively stiff upper edge to the CD-ROM holder 10. The relatively stiff edge 26 is desirable due to the fact that this edge of the CD-ROM holder 10 will be pushed by the binder along with the remaining signatures for the book, as described in my aforementioned U.S. Patent. Most or all of this portion of the CD-ROM holder 10 will be trimmed after the CD-ROM holder 10 is bound into the book.

In a preferred embodiment, a soft material is placed under the CD-ROM 16 in order to prevent abrasions to the surface thereof. A preferred material is VELVIN material manufactured by GenCorp of Jeanette, Pa. In a further preferred embodiment, the vinyl covering the topside of the CD-ROM 16 is formed from a 10-gauge anti-static vinyl.

Formation of the pocket seals 18 may be positioned so as to create an enclosed space 28 adjoining the pocket 14. The pocket 28 may contain, for example, a label which identifies the contents of the CD-ROM 16. Additionally, or in lieu of such label, the Poket 28 may be formed with two drilled holes 30 formed completely therethrough, which will allow the pocket 14 to be placed within a ring binder after removal of the pocket 14 from the CD-ROM holder 10.

The configuration of the CD-ROM holder 10 is suitable for binding the CD-ROM holder 10 into a book signature that is saddle stitched or sewn. Such saddle stitching or sewing will be performed at the thin rule seal 24, thereby binding the CD-ROM holder 10 into the book signature. Because the thin rule seal 24 comprises a tear line in the vinyl material, the CD-ROM holder 10 may be removed from the book after binding by tearing the CD-ROM holder 10 into two pieces along the thin rule seal 24, thereby releasing it from the saddle stitching or sewing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A CD-ROM holder suitable for binding, comprising:
    a first sheet of heat-sealable material;
    a second sheet of heat-sealable material overlying said first sheet of heat-sealable material;
    a plurality of first heat seal lines joining said first sheet to said second sheet and defining a pocket sized to receive the CD-ROM; and
    a thin rule seal formed in said first and second sheets and spaced from the pocket;
    wherein the holder may be bound by saddle stitching and easily unbound by dividing the holder along said thin rule seal.

2. The CD-ROM holder of claim 1, wherein the first and second sheets are vinyl.

3. The CD-ROM holder of claim 2, wherein the first and second sheets are 14-gauge vinyl.

4. The CD-ROM holder of claim 1, wherein the plurality heat-seal lines are tear lines.

5. The CD-ROM holder of claim 1, further comprising:
    a spacer for substantially surrounding the CD-ROM, wherein the spacer is substantially surrounded by the heat-seal.

6. The CD-ROM holder of claim 5, wherein the spacer is formed from cardboard having a cardboard thickness substantially equal to a CD-ROM thickness.

7. The CD-ROM holder of claim 1, further comprising:
    a soft material positioned between at least one of the sheets and the CD-ROM.

8. The CD-ROM holder of claim 7, further comprising:
    a spacer for substantially surrounding the CD-ROM, wherein the spacer is substantially surrounded by the heat-seal.

9. The CD-ROM holder of claim 1, wherein the plurality of first heat seal lines define a first pocket sized to receive the CD-ROM and a second pocket and wherein the second pocket adjoins the first pocket.

10. The CD-ROM holder of claim 9 wherein the second pocket includes a pair of apertures formed therethrough and wherein the apertures are sized and spaced to accommodate a standard ring binder.

11. A CD-ROM holder for containing a plurality of CD-ROMs, comprising:
    a first sheet of heat-sealable material having a first portion and a second portion;
    a second sheet of heat-sealable material at least partially overlying the first portion and the second portion of the first sheet of heat-sealable material;
    a plurality of first heat-seal lines joining the second sheet to the first portion of the first sheet and defining a first pocket sized to receive a first CD-ROM;
    a plurality of second heat-seal lines joining the second sheet to the second portion of the first sheet and defining a second pocket sized to receive a second CD-ROM;
    a thin rule seal formed in the first sheet and dividing the first and second portions;
    wherein the thin rule seal substantially bisects the first sheet;
    wherein at the first sheet may be bound by saddle-stitching and readily unbound by dividing along the thin rule seal.

12. The CD-ROM holder of claim 11, wherein the heat seal lines are tear lines.

13. The CD-ROM holder of claim 11, wherein the first and second sheets are vinyl.

14. The CD-ROM holder of claim 11, wherein the first and second sheets have different compositions.

15. The CD-ROM holder of claim 11, further comprising:
    a soft material contained within each pocket and positioned between the pocket and the CD-ROM.

16. The CD-ROM holder of claim 11, further comprising:
    a first spacer adapted to substantially surround a CD-ROM and contained within the first pocket; and
    a second spacer adapted to substantially surround a CD-ROM and contained within the second pocket.

17. A CD-ROM holder suitable for saddle-stitch binding, comprising:
    a first sheet of heat-sealable vinyl having a first portion and a second portion;
    a continuous thin-rule seal formed in the first sheet of heat-sealable vinyl between the first and the second portions;
    a second sheet of heat-sealable vinyl at least partially overlapping the first portion;
    a third sheet of heat-sealable vinyl at least partially overlapping the second portion;
    a plurality of first heat seals joining the second sheet to the first portion and defining a first pocket sized to receive a first CD-ROM;
    a plurality of second heat seals joining the third sheet to the second portion and defining a second pocket sized to receive a second CD-ROM;
    wherein the thin-rule seal substantially bisects the first sheet;
    wherein the first sheet may be bound into a book by saddle-stitching therethrough; and
    wherein the first sheet may be unbound by dividing along the thin-rule seal.

18. The CD-ROM holder of claim 17 wherein the second and third sheets are contiguous.

* * * * *